Patented Sept. 16, 1930

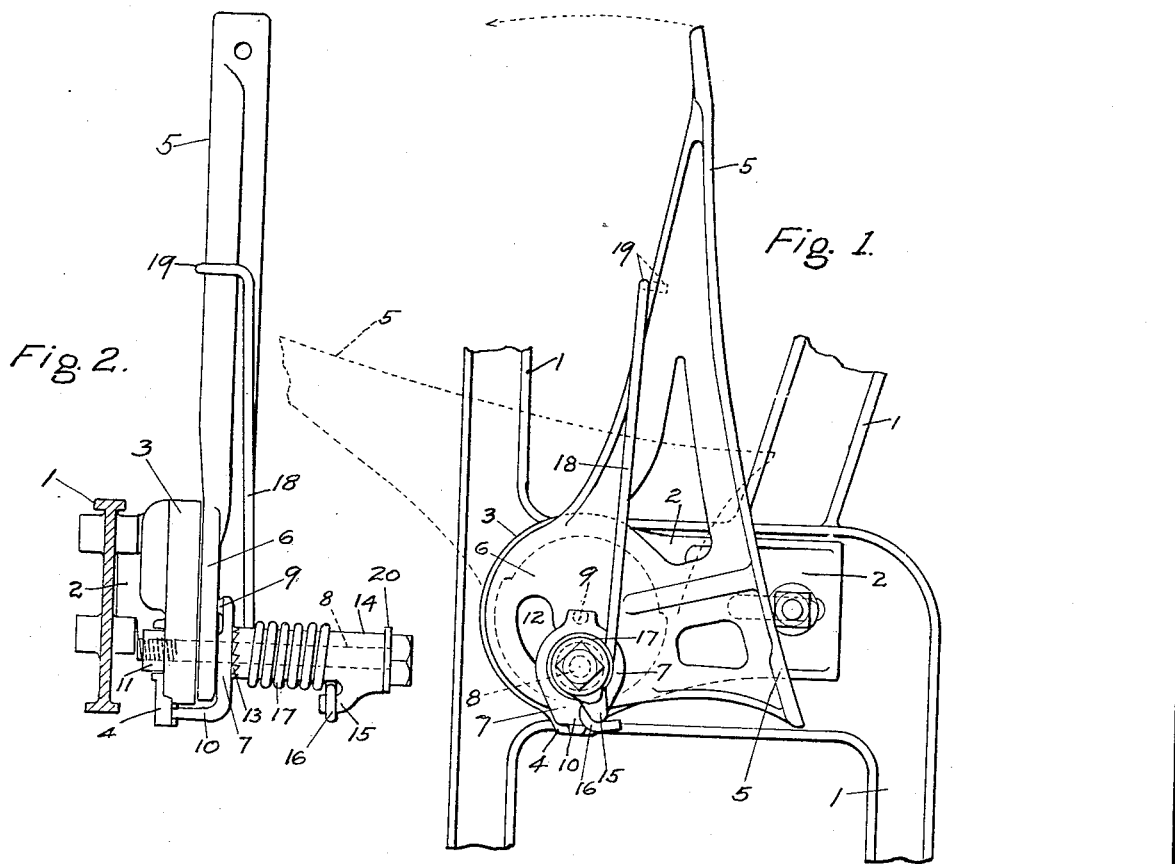

1,775,862

UNITED STATES PATENT OFFICE

FREDERICK MEDLER AND CLAUDE H. KURASCH, OF PORTLAND, OREGON

THEATER CHAIR

Application filed October 22, 1929. Serial No. 401,497.

Our invention relates to theater chairs in which a pipe sleeve and a spring are attached to the pivot of the seat.

The objects of our invention are to provide a simple device which can be quickly attached to theater chairs of this description, and which will raise the seat automatically from a horizontal to a vertical position as soon as weight or pressure is removed from the seat.

Other objects and advantages are to be found in the construction and arrangement of parts as will be described in the specifications and particularly pointed out in the appended claim.

We attain these objects with the mechanism illustrated in the accompanying drawing, in which:

Fig. 1 is a side view of a portion of the supporting frame disclosing the pivotal construction of the seat and the relative position of our spring.

Fig. 2 is a front view of Fig. 1 with special reference to the pipe sleeve and the spring.

Similar numerals refer to similar parts throughout the several views.

The chairs themselves are old in the art. They consist of the supporting frame 1, and attached thereto a flange 2 carrying the stationary pivotal cup 3; at the bottom of this stationary cup 3 is a downwardly extending projection 4, the purpose of which will be explained presently; the seat-holding bracket 5 carries a similar pivotal cup 6, which latter presses with its rim against the rim of the stationary cup 3 and, being an integral part of the seat-holding bracket 5, is movable relative to the stationary cup 3. Both cups 3 and 6 are held together by a clamp plate 7 and a bolt 8. The clamp plate 7 has a boss 9 which presses against the center of the movable cup 6, and a tail piece 10 which curves around the edges of the movable cup 6 and the stationary cup 3, and comes to a bearing on the projection 4 of the stationary cup 3. The surface of the clamp plate 7 in the prior construction is smooth. The bolt 8 which holds the movable cup 6 between the clamp plate 7 and the stationary cup 3, is shorter than shown in the drawing, presses with its head directly against the clamp plate 7, and carries at the bottom of the stationary cup 3 a nut 11, so that the friction between the two cups 3 and 6 can be varied according to need. The bolt 8 penetrates the two cups 3 and 6 off center, and in order to retain the movability of the seat, the movable cup 6 is provided with an arcuate slot 12 to furnish the necessary clearance for the bolt 8.

In our new construction we provide the clamp plate 7 with radial serrations 13 around the bolt hole; in addition thereto a somewhat longer bolt 8 is substituted for the customary short bolt. Fitted on to this bolt 8 between the serrations 13 on the clamp plate 7 and the head of the bolt 8 is a pipe sleeve 14. That end of the pipe sleeve 14 which rests on the clamp plate 7 is provided with serrations similar to those on said clamp plate; the other end of the pipe sleeve 14 carries a blunt barb 15 adapted to engage the short hooked end 16 of a helical spring 17, which latter is slipped on to the pipe sleeve 14. The long end 18 of the helical spring 17 is upwardly directed and also carries a hook 19, but this hook is adapted to engage the bottom edge of the seat-holding bracket 5, and to retain its place under the limited sliding motion which occurs when the seat-holding bracket is lowered to the horizontal position indicated by the dotted lines in Fig. 1.

The serrations 13 on the clamp plate 7 and the pipe sleeve 14 permit the spring 17 to be placed under any desired tension and at the same time to hold the two cups 3 and 6 together under any desired pressure.

The numeral 20 merely indicates a washer between the head of a bolt 8 and the pipe sleeve 14.

The entire arrangement is easily manufactured, quickly installed, and can be employed without fear of injury to the hands or clothing of patrons.

Having thus described our invention, it will be seen that our objects have been accomplished and though we have shown the preferred form of construction, we reserve to ourselves the right to make minor changes providing we do not violate the spirit and principle of our invention.

We claim:

In a theater chair having a supporting structure and a stationary pivotal cup attached thereto, with a seat-holding bracket having a movable pivotal cup attached thereto, with a bolt traversing the bottom of both cups, and stationarily mounted in the stationary cup, a pipe sleeve around the bolt, said pipe sleeve having a blunt barb adjacent to the head of the bolt, said barb being directed toward the movable cup, a clamp plate pressing against the center of the movable cup and held in position by the bolt, the end of the pipe sleeve and the surface of said clamp plate around the bolt having complementary, radially directed serrations, and a helical spring slipped on to the pipe sleeve, said helical spring having a short hooked end in engagement with the barb on the pipe sleeve, and a long, upwardly directed end, and a hook at said long end to engage the bottom edge of the seat-holding bracket.

In testimony whereof we affix our signatures.

FREDERICK MEDLER.
C. H. KURASCH.